Patented Feb. 23, 1926.

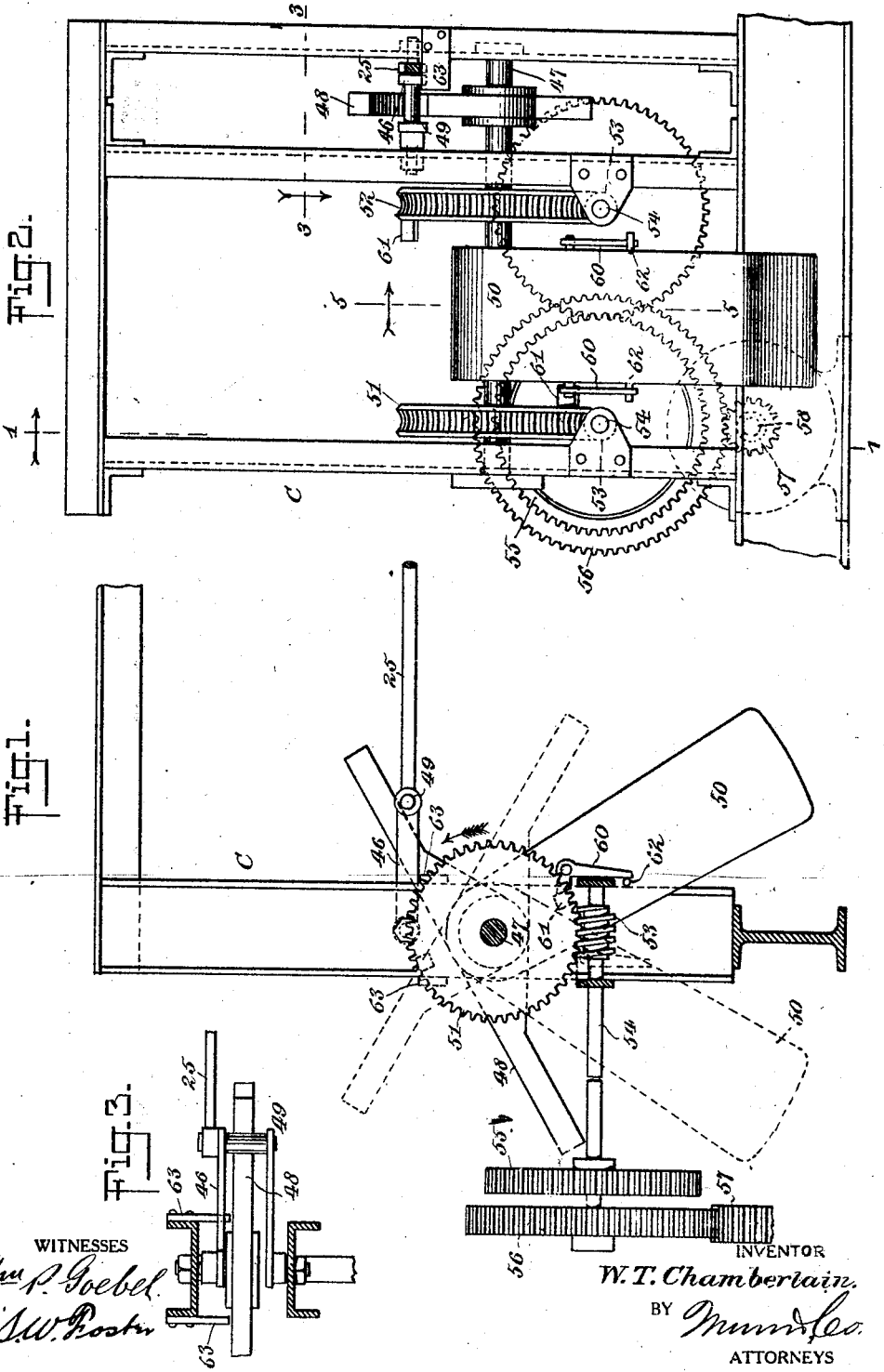

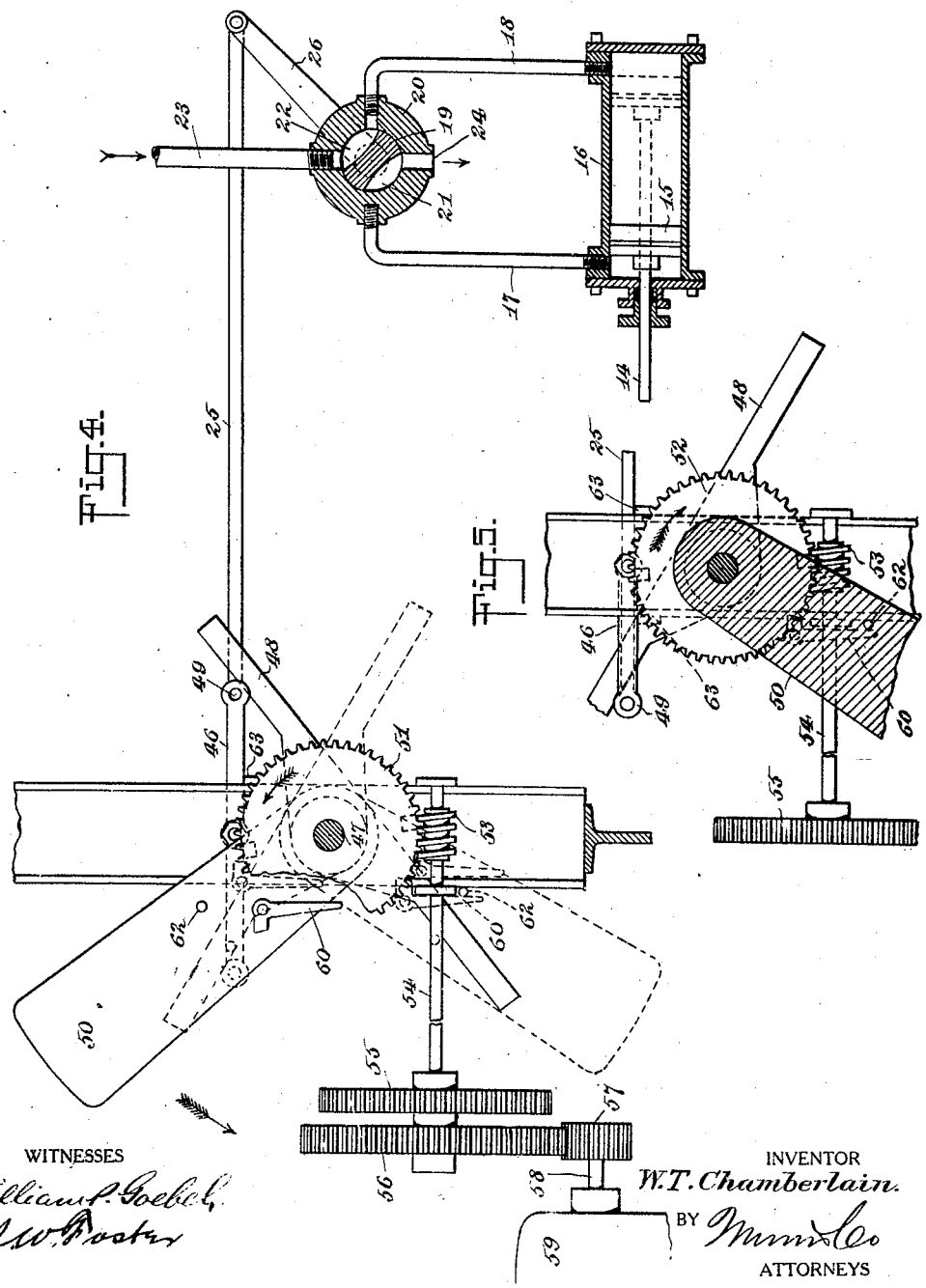

1,574,604

UNITED STATES PATENT OFFICE.

WILLIAM T. CHAMBERLAIN, OF NEW YORK, N. Y.

AUTOMATIC SHIFTER.

Original application filed May 31, 1924, Serial No. 717,077. Divided and this application filed April 23, 1925. Serial No. 25,334.

*To all whom it may concern:*

Be it known that I, WILLIAM T. CHAMBERLAIN, a citizen of the United States, and a resident of the city of New York, borough of Manhattan, in the county and State of New York, have invented a new and Improved Automatic Shifter, of which the following is a full, clear, and exact description.

This invention relates to automatic shifters and more particularly to an automatic shifter for a valve or valves, the object of the invention being to provide an apparatus which will automatically shift the valve and permit the valve to remain in one position for a predetermined length of time, and then quickly and suddenly shift the position of the valve.

While I refer to my device as a shifter designed primarily for shifting a valve it is obvious that I do not limit myself in this respect but desire to cover the apparatus broadly for any uses to which it can be put.

The device is, however, primarily designed for use in connection with my improved air preheater, disclosed in my pending application for patent filed May 31, 1924, Serial No. 717,077, of which this application is a division.

With these and other objects in view, the invention consists in certain novel features of construction and combinations and arrangements of parts, which will be more fully hereinafter described and pointed out in the claims.

In the accompanying drawings—

Figure 1 is a view illustrating my improved valve shifter, the view being taken in section on the line 1—1 of Figure 2;

Figure 2 is a view in elevation at right angles to Figure 1, showing the arrangement of parts constituting my improved mechanism;

Figure 3 is a fragmentary view in section on the line 3—3 of Figure 2;

Figure 4 is a sectional view illustrating the assemblage of my improved mechanism in connection with a valve and its co-operating parts;

Figure 5 is a fragmentary view in section on the line 5—5 of Figure 2.

14 represents an operating rod which may be connected to any desired reversing mechanism. This rod is fixed to a piston 15 mounted to reciprocate in a cylinder 16 and caused to move by suitable fluids such as air or steam which may be admitted through pipes 17 and 18 the latter connecting the respective ends of the cylinder 16 with a valve casing 20 having a rotary valve 19 therein.

This valve 19 is preferably of the plug or turning type having two passages 21 and 22, so that when the valve is in the position shown in Figure 4 a fluid supply pipe 23 is in communication with the pipe 18, and the pipe 17 is in communication with an outlet 24. When the valve is turned so as to reverse its position fluid is admitted through the pipe 17 to move the piston 15 to the right of Figure 4, and the fluid in the cylinder exhausts through the outlet 24.

As clearly set forth in my original application above described, it is desirable that the valve 19 operate quickly from one extreme position to another, and it is the purpose of my device or mechanism, which constitutes the subject matter of this application, to provide means for carrying out this result.

C represents a supporting framework providing mounting for a crank arm 46 which is connected by a rod 25 with a valve crank arm 26. This framework C also provides mounting for a shaft 47 on which a bar 48 is fixed between its ends, and the respective ends of this bar 48 are adapted to engage a crank pin 49 on the crank arm 46 to throw the valve as will be hereinafter explained.

A relatively heavy weighted arm 50 is also fixed to the shaft 47, and on said shaft 47 at opposite sides of the weighted arm 50 worm wheels 51 and 52 are loosely mounted. These worm wheels 51 and 52 are turned by worms 53 on shafts 54, and these shafts 54 have gear wheels 55 fixed thereon which under-mesh so as to compel the worm shafts 54 to turn in opposite directions and transmit motion in opposite directions to the worm wheels 51 and 52, respectively.

On one of the shafts 54 a large gear wheel 56 is fixed and is turned by a pinion 57 on a shaft 58 driven by a motor, preferably an electric motor, 59. The weighted arm 50 carries at opposite sides bell crank ratchet arms 60, these arms being reversely positioned at opposite sides with the shorter ends of the ratchet arms adapted to be engaged by lugs 61 on the worm wheels 51 or 52 and the longer ends of the arm engage fixed pins 62 on the weighted arm 50.

The operation of this valve-throwing mechanism is as follows: Assuming the parts to be in the position shown in Figure 1, it will be noted that the worm wheel 51 has its lug 61 in engagement with the bell crank ratchet arm 60 so that the longer end of said arm is held against the pin 62, and hence the weighted arm is being carried around by the worm wheel in the direction of the arrow.

This movement of the weighted arm causes the shaft 47 to turn and carry the bar 48 around with it. The crank arm 46 remains stationary until the left-hand end of the bar 48, shown in Figure 1, moves around far enough to engage the crank pin 49 on the arm 46. This position is shown in full lines in Figure 4. At this point the weighted arm 50 will fall in the direction of the arrow (see Figure 4) and the bar 48 will cause the crank arm 46 to swing rapidly over to the dotted line position of Figure 4 so that the valve 19 will be instantly shifted and the direction of flow of the fluid controlled by said valve will be reversed so that the piston 15 will be moved toward the opposite end of the cylinder 16. The fall of the weighted arm 50 causes the ratchet arm 60 to move away from the lug 61, as will be readily understood. It is desirable to provide stop pins 63 on the framework C to limit the movement of the crank arm 46. After the weighted arm has moved to the dotted line position in Figure 4 it will be caused to move in the reverse direction and repeat the operation above described by action of the worm wheel 52 and its lug 61.

It will, of course, be noted that the ratchet arms 60 permit the lugs 61 to pass in one direction but compel the arm to move with the lug in the opposite direction.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. An automatic shifter adapted to throw a valve, comprising a support, a valve-throwing crank arm on the support, a shaft on the support, a bar fixed between its ends to the shaft and adapted at its ends to engage the crank arm, a weighted arm fixed to the shaft, a pair of worm wheels loose on the shaft and at opposite sides of the weighted arm, means for turning said worm wheels in opposite directions, lugs on the worm wheels, ratchet means on opposite sides of the weighted arm whereby the arm is caused to move in one direction by one worm wheel and in the other direction by the other worm wheel, and whereby said arm when the bar engages the crank arm falls of its own weight to quickly move the crank arm from one position to another and to quickly reverse the valve.

2. A valve shifter including a support, a shaft on the support, a weighted arm fixed to the shaft, means for transmitting motion to the shaft to turn the same in opposite directions, and means causing the release of the shaft from its operating means whereby the weight may fall by gravity and complete the movement of the shaft.

3. A valve shifter, including a support, a shaft on the support, a weighted arm fixed to the shaft, means for transmitting motion to the shaft to turn the same in opposite directions, means causing the release of the shaft from its operating means whereby the weight may fall by gravity and complete the movement of the shaft, and members projecting at an angle to the weight and adapted to engage a movable part and transmit motion thereto in opposite directions.

4. A valve shifter, including a support, a shaft on the support, a weighted arm fixed to the shaft, means for transmitting motion to the arm to turn said shaft in opposite directions, the arm being adapted for release from its operating means whereby the arm may fall by gravity and complete the movement of the shaft, said release occurring at a predetermined time in both directions of movement.

5. An automatic shifter, comprising a support, a valve-throwing crank arm on the support a shaft on the support, a bar fixed between its ends to the shaft and adapted at its ends to engage the crank arm, a weighted arm fixed to the shaft, a pair of worm wheels loose on the shaft and at opposite sides of the weighted arm, means for turning said worm wheels in opposite directions, lugs on the worm wheels, and ratchet means on opposite sides of the weighted arm whereby the arm is caused to move in one direction by one worm wheel and in the other direction by the other worm wheel, and is released from such engagement after the arm is moved a predetermined distance.

WILLIAM T. CHAMBERLAIN.